United States Patent [19]

Oishi et al.

[11] Patent Number: 5,701,002
[45] Date of Patent: Dec. 23, 1997

US005701002A

[54] IDENTIFICATION CARD AND ITS MANUFACTURE

[75] Inventors: Tadahiro Oishi; Toshifumi Onishi; Yasuo Yoshioka, all of Osaka, Japan

[73] Assignees: Shoei Printing Co., Ltd.; Toyobo Co., Ltd.; Marusho Co., Ltd., all of Osaka, Japan

[21] Appl. No.: 599,342

[22] Filed: Feb. 8, 1996

[30] Foreign Application Priority Data

Feb. 9, 1995 [JP] Japan ............................. 7-021861
Jul. 5, 1995 [JP] Japan ............................. 7-169690

[51] Int. Cl.⁶ .......................... C06K 19/00; C06K 19/106
[52] U.S. Cl. ............................................. 235/487; 235/493
[58] Field of Search ............................. 235/487, 488, 235/486, 380, 492, 493, 449; 350/3.6, 3.61, 3.63; 369/94

[56] References Cited

U.S. PATENT DOCUMENTS

| | | | |
|---|---|---|---|
| 4,831,244 | 5/1989 | Slafer et al. | 235/487 |
| 4,849,618 | 7/1989 | Namikawa et al. | 235/487 X |
| 5,111,033 | 5/1992 | Fujita et al. | 235/488 |
| 5,498,860 | 3/1996 | Ohno et al. | 235/487 |

*Primary Examiner*—Donald T. Hajec
*Assistant Examiner*—Thien Minh Le
*Attorney, Agent, or Firm*—Wenderoth, Lind & Ponack

[57] ABSTRACT

An identification card comprises a card body formed from substantially unoriented heated crystallized polyethylene terephthalate resin, and is equipped to generate a recognizable identification signal. A concave portion may be formed on one side of the card body to accommodate, for example, magnetic memory media, to generate the identification signal.

24 Claims, 6 Drawing Sheets

IDENTIFICATION CARD AND ITS MANUFACTURE

BACKGROUND OF THE INVENTION

The invention relates to identification cards having identification signal generating means (such as semiconductors, magnetic stripe, etc.) which are used as cash cards, ID cards, and credit cards, etc.; and to the production of such identification cards involving substantially unoriented spherically crystallized polyethylene terephthalate resin sheets.

Figure 7:
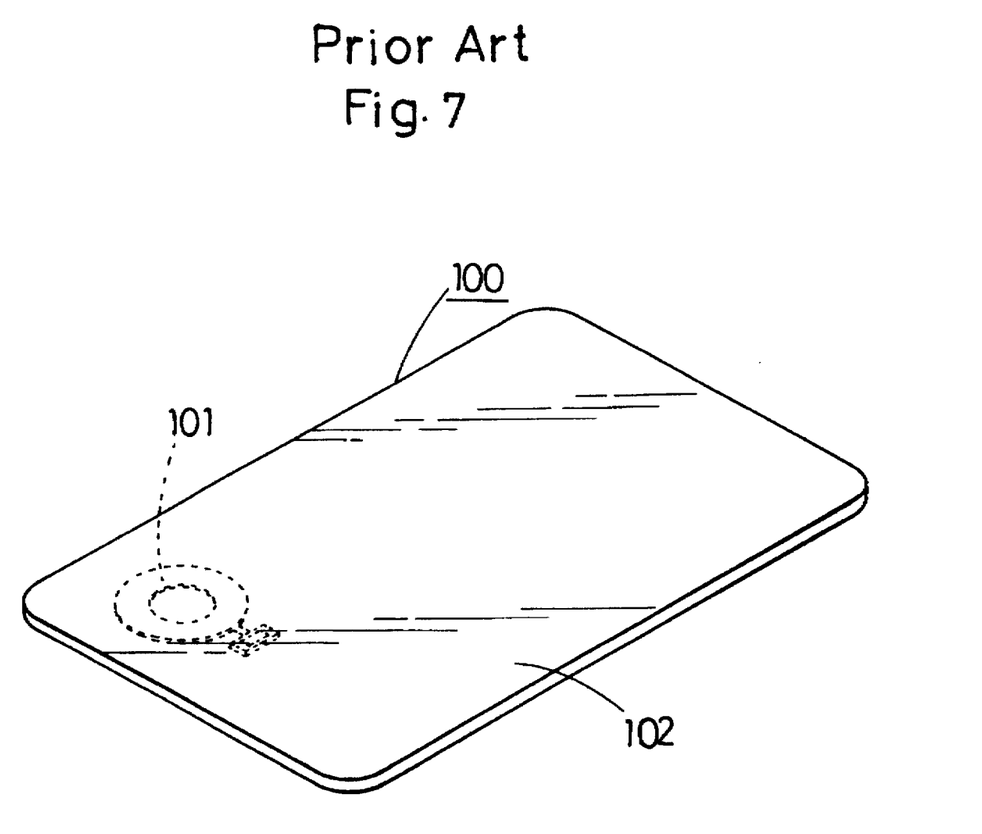
FIG. 7 shows a conventional identification card.

Conventionally, identification cards (such as cash cards, ID cards, credit cards, etc.) like the non-contact type of card 102 (shown in FIG. 7) have a card body 100 formed of polyvinyl chloride resin and have electronic components (including semiconductors), as identification signal generating means 101, embedded therein. Alternatively, the identification signal generating means may be set in a cavity or concave portion of one side of the card body. Or in the contact-type identification card, the magnetic stripe (tape magnetic memory) may be set along one side of the card body.

Figure 8:
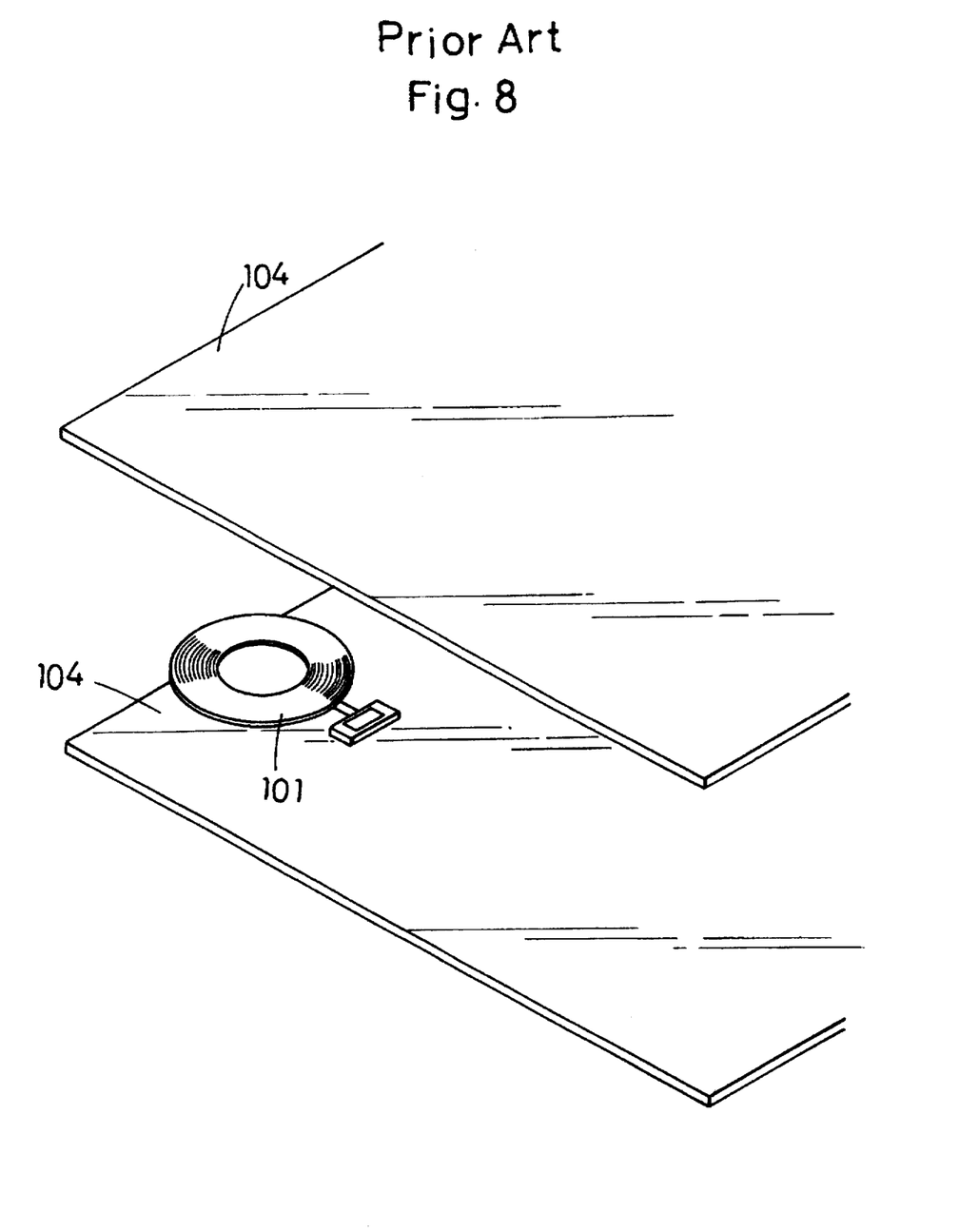
FIG. 8 shows the production method of identification cards of FIG. 7.

For example, in identification cards 102 of the non-contact type (as shown in FIG. 8), identification signal generating means 101 are set between two PVC resin sheets 104 which are heat pressed and joined together into one body and then can be made in a specific shape by stamping or punching.

However, recently, identification cards (having attached magnetic stripes, contact-type IC chips, and embedded non-contact type IC chips, etc.) are being diversified into various shapes. Moreover, there is a demand for long term stability and operability in a high temperature condition.

But conventional identification cards are formed of PVC resin, and therefore, have a heat resistance of up to about 60° C., which cannot satisfy the above requirement.

Furthermore, the burning of chlorine molecules combined with PVC resin, emits harmful chlorine-type gas and damages the environment.

This invention seeks to provide cards with long term stability in high temperature operation, to avoid any harmful gas by-product from burning, and to provide a production method of these cards from substantially unoriented non-crystallized polyethylene terephthalate resin sheets.

To meet above-mentioned requirement, this invention pays attention to extended polyethylene terephthalate resin sheets having good heat resistance and no harmful gas by-product.

But an oriented polyethylene terephthalate resin sheet can only be formed with a thickness of 100 or so micrometers. There is no problem for thin cards like prepaid cards, but there are some problems for thick cards having electronic components (such as semiconductors) as identification signal generating means inside the cards.

In other words, a large number of polyethylene terephthalate resin sheets are laminated and bonded together by glue. To obtain adequate thickness, more bonding process is required which leads to a more complex production process requiring more multiple bonding layers formed between polyethylene terephthalate resin sheets. This results in poor dimensional stability.

SUMMARY OF THE INVENTION

Identification cards comprise a card body formed from substantially unoriented heated crystallized polyethylene terephthalate resin, with identification signal generating means for generating a recognizable identification signal.

Further, the identification cards have a concave portion on one side of the card body to accommodate identification signal generating means.

The construction of identification cards may have identification signal generating means of magnetic memory media of the desired width which is integrally formed with at least one side of the card body.

Further, the identification cards of the second embodiment comprise identification signal generating means for generating a recognizable identification signal, and a concave portion on the surface of substantially unoriented heated crystallized polyethylene terephthalate resin layer made from polyethylene terephthalate resin sheet having tensile strength at 100° C. of more than 100 Kg/mm$^2$. There is also a covering layer laminated over said substantially unoriented crystallized polyethylene terephthalate resin layer.

On the identification cards, "substantially unoriented" means there is no extension in the sheet production process.

Substantially unoriented crystallized polyethylene terephthalate resin sheets are produced by heating (and thereby crystallizing) substantially unoriented non-crystallized polyethylene terephthalate resin sheets.

Substantially unoriented polyethylene terephthalate resin sheet is produced by first adding crystallizing agents to the polyethylene terephthalate resin and then preferably antioxidants, then adding delustering agents, and then quickly cooling to form in sheet and rolling up or cutting into pieces.

Thickness of the sheet is preferably 200–1300 μm, and more preferably 400–800 μm.

For the crystallizing agent, inorganic nucleating agent (such as talc or kaolin), polyolefin such as low density linear polyethylene, or ionomer can be used.

The amount of crystallizing agent for addition to polyethylene terephthalate resin is preferably 0.1 to 10% by weight, and more preferably 1.5 to 3% by weight.

During card production, a delustering agent is added to make the printing more clear.

In this invention, homopolymers of polyethylene terephthalate are preferable. However, its copolymers could be applicable wherein, for example, terephthalic acid is partially substituted with isophthalic acid, adipic acid and other dicarboxylic acids; and ethyleneglycol is partially substituted with tetramethyleneglycol, diethyleneglycol or similar glycols.

The card body preferably can tolerate high temperatures of 220° C. and with at least 100 Kg/mm$^2$ of tensile strength at 100° C.

To obtain a card body with above-mentioned heat resistance and tensile strength, the above-mentioned substantially unoriented non-crystallized polyethylene terephthalate resin sheets are heated ordinarily at 140° C. to 185° C. for 5 to 70 seconds, to an extent of crystallization of 15 to 45%, and preferably 25 to 35%, and resulting in production of spherulite crystals.

And both surfaces of the card body can be printed or embossed, before or after the identification signal generating means is assembled.

Furthermore, for the polyethylene terephthalate resin sheets with tensile strength of at least 100 Kg/mm$^2$ at 100° C. for the identification cards, oriented polyethylene terephthalate resin sheets or heated substantially unoriented crystallized polyethylene terephthalate resin sheets can be used.

For glue, known polyester resin glues can be used.

The production method for identification cards, involves after pressing a desired portion of unheated substantially unoriented non-crystallized polyethylene terephthalate resin sheet to form a concave portion, then heating and pressing the resin sheet to become crystallized, and assembly to fix identification signal generating means into above-mentioned concave portion.

Further, regarding the production method of identification cards having magnetic memory media, attach magnetic recording media sheet of desired width before heating, on desired portion of unheated substantially unoriented non-crystallized polyethylene terephthalate resin sheets; then heat and press the resin sheet to become crystallized to form a card body; at the same time, the above-mentioned magnetic recording media sheet is integrally formed with the card body.

Further, in the production method of identification cards, after forming a concave portion at the desired portion of unheated substantially unoriented non-crystallized polyethylene terephthalate resin sheets, heating makes the resin sheet become crystallized. Then identification signal generating means can be assembled into the above-mentioned concave portion. Then laminating, with glue, substantially unoriented spherically crystallized polyethylene terephthalate resin sheet to polyethylene terephthalate resin sheet with tensile strength of at least 100 Kg/mm$^2$ at 100° C. Lastly, forming a covering layer to block the open part of said concave portion.

In the production methods, the timing of the crystallization by heating substantially unoriented non-crystallized polyethylene terephthalate resin sheets, has no specific limitation, but it is preferable after assembly of identification signal generating means.

And, the size of the cavity of the concave portion will naturally decrease as the result of the orientation of the polyethylene terephthalate resin sheets being heated. Accordingly, it is necessary to preset the size of the concave portion large enough so that even upon decrease, its size is still large enough to accommodate the identification signal generating means to be assembled therein.

The substantially unoriented crystallized polyethylene terephthalate resin sheets, by heating at 160° C. for one minute, obtain tensile strength at 100° C. of at least 100 Kg/mm$^2$.

According to this invention, first, there is assembled identification signal generating means of IC devices or magnetic memory media types at desired portion of unheated substantially unoriented non-crystallized polyethylene terephthalate resin sheets of the desired shape for the card body. Then there is heating at 160° C. for one minute so that the resin sheets will be crystallized to have tensile strength of at least 100 Kg/mm$^2$ at 100° C. Thus identification cards with heat resistance of 220° C. can be obtained.

In other words, according to the construction of identification cards, a card body is formed of substantially unoriented crystallized resin, and has sufficient heat resistance, and only carbonic acid gas and water comes out during burning.

According to the production method, sheets of desired thickness are obtained at first from unheated substantially unoriented non-crystallized polyethylene terephthalate resin. Unheated substantially unoriented non-crystallized polyethylene terephthalate resin is different from extended polyethylene terephthalate resin, in that sheets of arbitrary thickness without lamination, can be obtained.

The sheets obtained in this manner from unheated substantially unoriented non-crystallized polyethylene terephthalate resin, are easy to process, so a concave portion can be simply formed by pressing.

Next, by heating the concave portion formed in this manner, the polyethylene resin will be crystallized and a heating resistance near 220° C. can be obtained and its strength can be improved.

Hence, identification cards can be obtained by assembling identification signal generating means into concave portion before and after heating.

According to the production method, firstly sheets of desired thickness can be obtained from unheated substantially unoriented non-crystallized polyethylene terephthalate resin.

Then, after attaching a magnetic stripe on at least one side of sheets obtained in this manner, polyethylene resin will be crystallized by applying heat and pressure. Heat resistance will be near 220° C. and strength can be improved. The magnetic stripe will be embedded in the sheet by pressure so as to expose only the surface. Thus the identification cards, with magnetic stripe embedded within the card body, can be obtained.

Hence, at the same time of assembling identification signal generating means into a cavity or concave portion before and after heating, in case of substantially unoriented crystallized terephthalate resin sheets forming cavity, on front and back surfaces of substantially unoriented crystallized polyethylene terephthalate resin sheet with tensile strength of at least 100 Kg/mm$^2$ at 100° C., laminated by glue, identification cards can be obtained.

According to construction of sheets, the card body of identification cards with heating resistance of 220° C. or more can be obtained by heating at 160° C. for one minute.

BRIEF DESCRIPTION OF THE DRAWINGS

Preferred embodiments of the invention will be described in detail in conjunction with the following Figures:

FIGS. 6(A) and 6(B) show an example of production method of identification cards of FIG. 5, wherein FIG. 6(A) shows card body with magnetic stripe attached and FIG. 6(B) shows state of heating and pressure process.

DETAILED DESCRIPTION OF THE PREFERRED EMBODIMENTS

Figure 1:
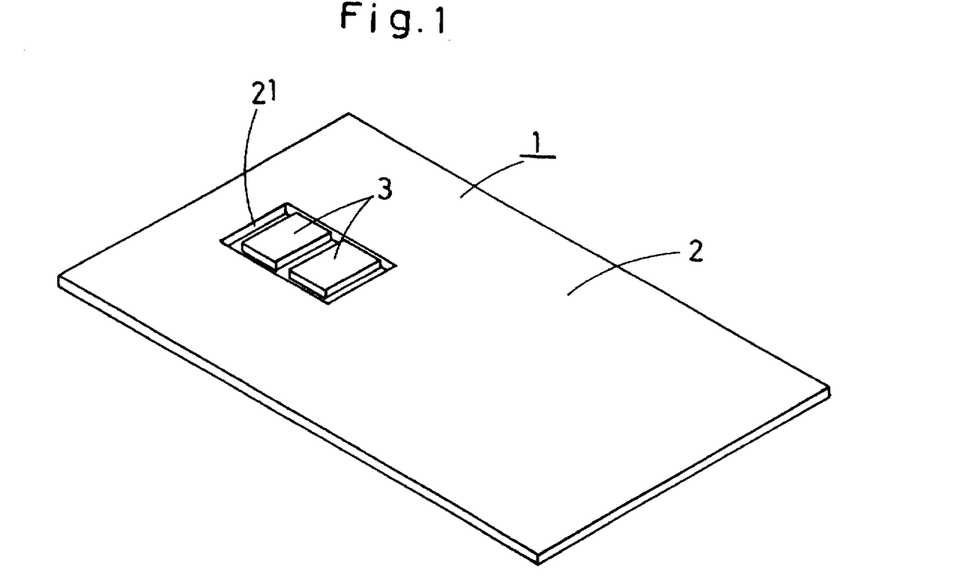
FIG. 1 shows a first embodiment of identification cards of the invention.
Figure 2:
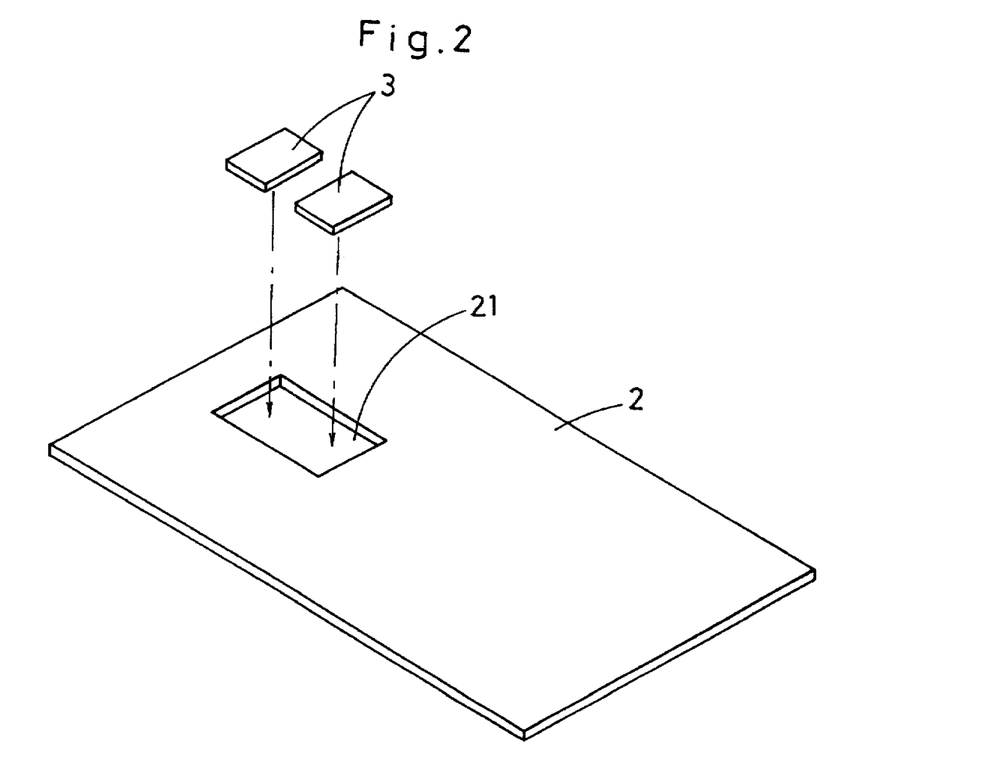
FIG. 2 shows an example of production method of identification cards of FIG. 1.

FIG. 1 shows a first example of identification cards in the invention, and FIG. 2 shows its production method.

As shown in FIG. 1, this identification card i comprises card body 2 and electronic component 3 as identification signal generating means, forming a contact-type identification card.

Card body 2 is formed from substantially unoriented heated crystallized polyethylene terephthalate resin.

Identification card I is produced as follows.

Firstly, prepare unheated substantially unoriented non-crystallized polyethylene terephthalate resin sheets which have a thickness greater than the thickness of electronic component 3. Form cavity or concave portion by pressing electronic component 3 therein. Heat at 160° C. for one minute to crystallize. As shown in FIG. 2, card body 2 with cavity or concave portion 21 can be obtained. Card body 2's tensile strength is measured as at least 100 Kg/mm$^2$.

Next, assemble electronic component 3 with card body 2 by inserting electronic component 3 into cavity or concave portion 21 with glue.

Identification card i obtained in this way is formed of substantially unoriented heated crystallized polyethylene terephthalate resin, so it has about 220° C. of heat resistance and long-term storage stability even in high temperature environment.

And there are no sources of harmful chlorine-type gas in the resin from which card body 2 is formed, so there is no pollution problem by burning, Furthermore, card body 2 can be obtained with only one piece of substantially unoriented crystallized polyethylene terephthalate resin sheet without the troublesome process of lamination of multiple sheets by glue. This not only simplifies the production process but also results in good dimension stability.

Figure 3:
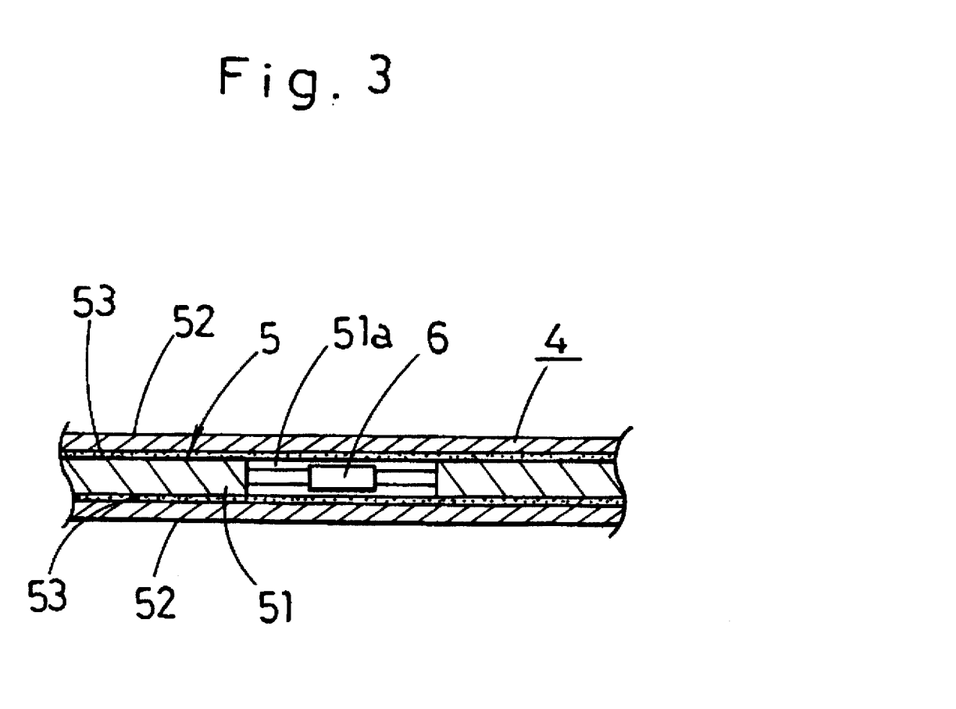
FIG. 3 shows a second embodiment of identification cards of the invention.
Figure 4:
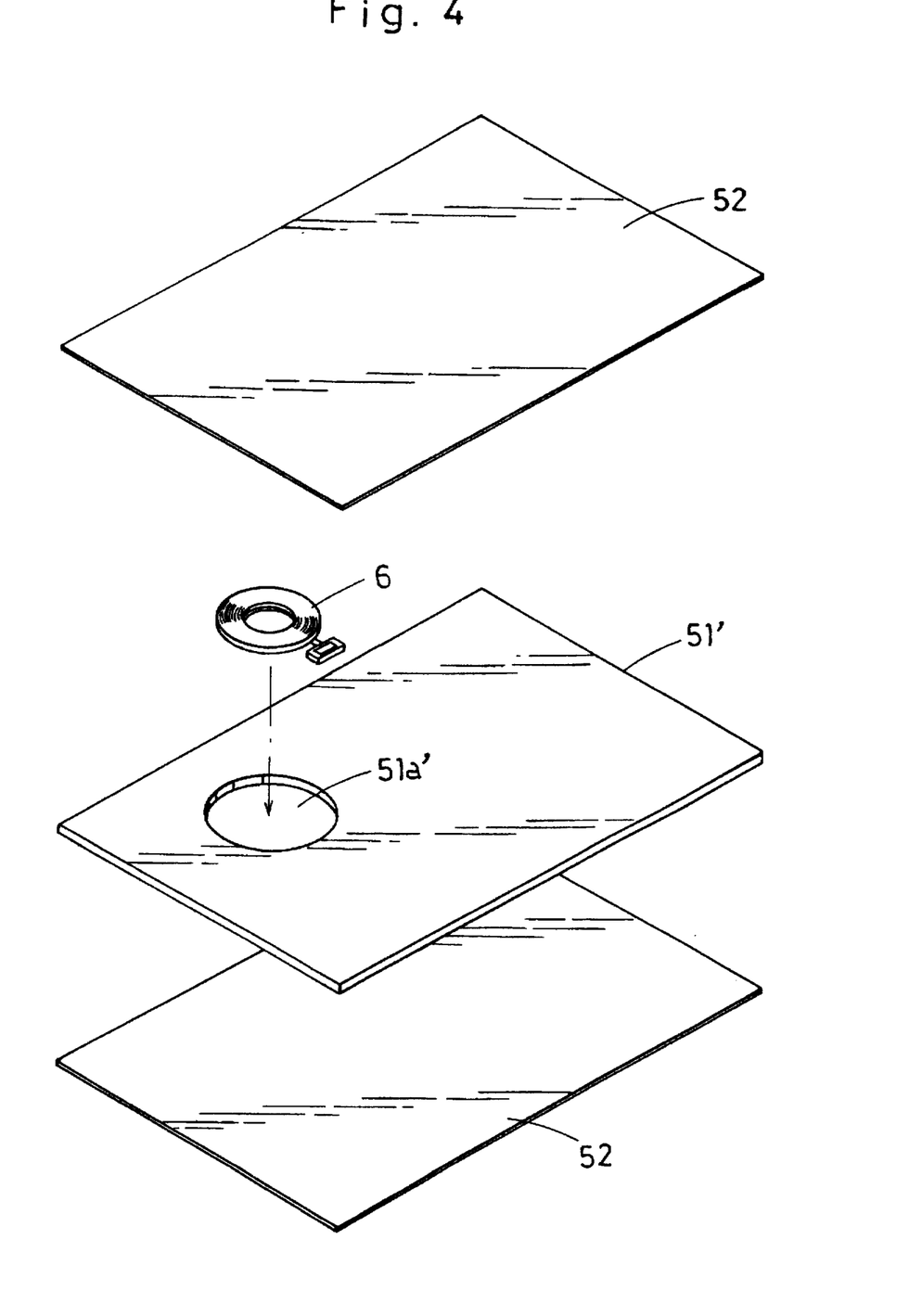
FIG. 4 shows an example of production method of identification cards in FIG. 3.

FIG. 3 shows a second application example of an identification card of the invention. FIG. 4 shows its production method.

As shown in FIG. 3, this identification card 4 comprises card body 5 and electronic component 6 as identification signal generating means.

Card body 5 comprises core 51 which is obtained from substantially unoriented crystallized polyethylene terephthalate resin layer sandwiched between cover surface layers 52.

Core 51 is formed of substantially unoriented polyethylene terephthalate resin sheet with a thickness roughly the same as, or a little thicker than, electronic component 6.

As shown in FIG. 3, core 51 has hole 51a, which accommodates electronic component 6.

Surface layer 52 is formed of extended polyethylene terephthalate resin sheet, bonded to core 51 by glue 53. In other words, hole 51a is enclosed by surface 52.

This identification card 4 is produced as follows.

Firstly as shown in FIG. 4, prepare unheated substantially unoriented polyethylene terephthalate resin sheets 51' having a thickness more than electronic component 6, and a through hole 51a' is equipped with the electronic component. Sheet 51 can be that named PETMAX-C from Toyo Spinning Company.

Then heat substantially unoriented polyethylene terephthalate resin sheet 51' at 160° C. for one minute to become crystallized to obtain core 51.

At this moment, aforementioned resin sheet 51' is expanded in accordance with the crystallization, and hole 51a' shrinks to hole 51a of smaller size as shown in FIG. 3. Electronic component 6 is held firmly by the inner surface of hole 51a. In other words, the hole is made a little larger than the outside size of electronic component 6 and will shrink due to heating.

Next, front surface 52 is formed of extended polyethylene terephthalate resin sheet embodied by bonding front and back surfaces of core 51 by polyester resin glue 53.

In other words, identification card 4 can be obtained where card body 5 is formed by binding simultaneously with electronic component 6 inside card body 5.

Identification card 4 obtained in this way has card body 5 formed from core 51 which is formed by substantially unoriented heated crystallized polyethylene terephthalate resin and surface 52 which is formed by extended polyethylene terephthalate resin sheet and with polyester binding material, so it has tensile strength of at least 100 Kg/mm$^2$ at 100° C., and can be kept for long-term storage stability even in high temperature operating condition.

And there are no sources of harmful chlorine-type gas in the resin from which card body 5 is formed, so there is no pollution problem by burning.

Furthermore, card body 2 can be obtained with only one piece of substantially unoriented crystallized polyethylene terephthalate resin sheet without the troublesome process of lamination of multiple sheets by glue in production. This not only simplifies the production process but also provides good dimensional stability.

Figure 5:
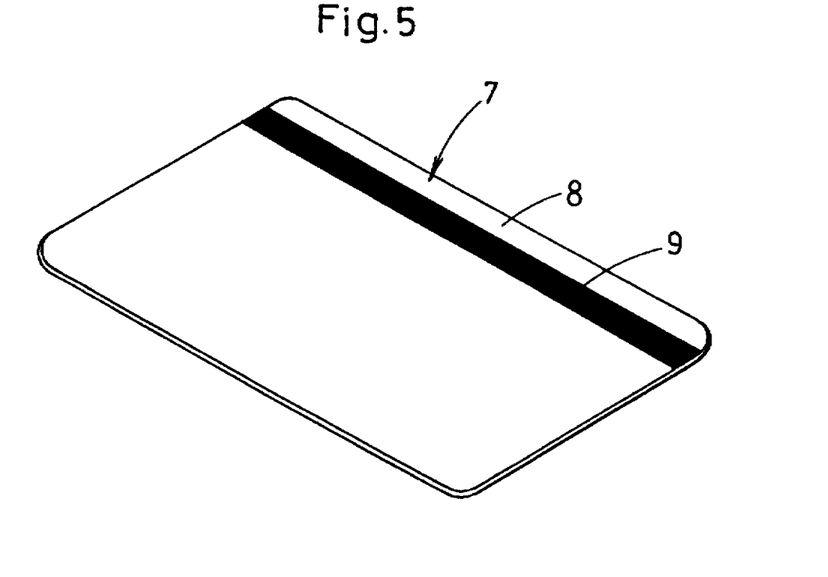
FIG. 5 shows a third example of identification cards of the invention.
Figure 6A:
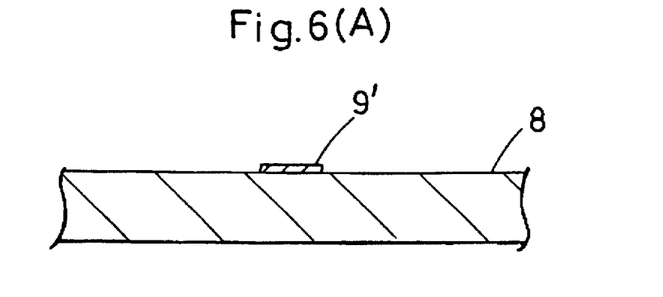
Figure 6B:
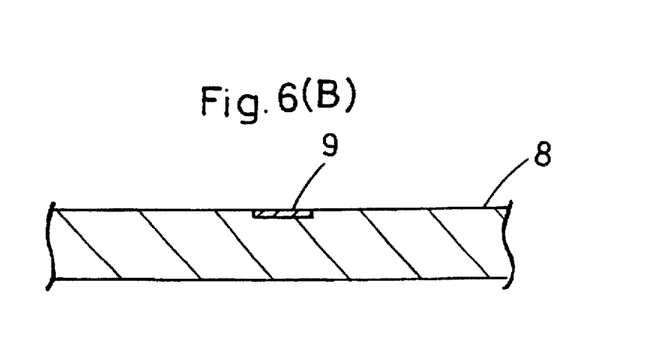

FIG. 5 shows a third application example of the identification card of the invention. FIG. 6 shows its production method.

As shown in FIG. 5, this identification card 7 comprises card body 8 and magnetic stripe 9.

Card body 8 is formed from substantially unoriented heated crystallized polyethylene terephthalate resin.

This identification card 7 is produced as follows.

Firstly, as shown in FIG. 6(A), substantially unoriented non-crystallized polyethylene terephthalate resin sheet 8 of specified thickness is prepared, and after attaching magnetic memory media tape 9' at a desired position on sheet 8', sheet 8' will be crystallized by heating at 160C for one minute. At the same time, magnetic memory media tape 8' will be embedded inside card body 8 as shown in FIG. 6(B).

Identification card 7 is obtained in this way has card body 8 formed of substantially unoriented heated crystallized polyethylene terephthalate resin, which provides long-term storage stability even in high temperature conditions.

Identification cards and their production method of the invention are not limited to the above-mentioned application examples. A card body can be printed with electronic component or a magnetic stripe or both.

A barcode can be printed on the surface or a hologram can be set on the surface.

And, in identification card 4 of the second example core 51 can be formed from one piece of unheated substantially unoriented non-crystallized polyethylene terephthalate resin sheet and two pieces of extended polyethylene terephthalate resin sheets bonded together with glue 53 to obtain card body 5. Like the identification card 1 of the above-mentioned first example, a cavity or concave portion can be formed by pressing on one side of the unheated substantially unoriented non-crystallized polyethylene terephthalate resin sheet, along with assembling an electronic component into this cavity or concave portion and heating to crystallize the resin sheet, then laminating with glue an extended polyethylene terephthalate resin sheet over the cavity or concave portion.

Furthermore, in identification card 7 of above-mentioned third example, magnetic stripe 9 is embedded inside card body 8, but it can be bonded by glue on the surface of card body 8.

While particular embodiments of the invention have been disclosed, it is to be understood that various different modifications are possible and are contemplated as being within the true spirit and scope of the claims.

We claim:

1. A method of producing an identification card having an identification signal generation means therein, comprising:

forming an aperture or concave portion having a larger diameter than the outer diameter of the identification signal generation means in a substantially unoriented non-crystallized polyethylene terephthalate resin sheet having a larger thickness than the thickness of the identification signal generation means; and heating the non-crystallized resin sheet, having the identification signal generation means in the aperture or concave portion, to crystallize the resin sheet, thus forming a substantially unoriented crystallized polyethylene terephthalate resin sheet;

whereby the aperture or concave portion shrinks, by the heating, to hold the identification signal generation means in the crystallized resin sheet.

2. The method of claim 1, wherein the crystallized resin sheet has a crystallization degree of 15–45%, and has spherulite crystals.

3. The method of claim 1, wherein the crystallized resin sheet has a heat resistance of 220° C. and a tensile strength of at least 100 kg/mm$^2$ at 100° C.

4. The method of claim 2, wherein the crystallized resin sheet has a heat resistance of 220° C. and a tensile strength of at least 100 kg/mm$^2$ at 100° C.

5. The method of claim 1, wherein the heating is conducted at 160° C. for one minute.

6. The method of claim 2, wherein the heating is conducted at 160° C. for one minute.

7. The method of claim 3, wherein the heating is conducted at 160° C. for one minute.

8. The method of claim 4, wherein the heating is conducted at 160° C. for one minute.

9. The method of claim 1, further comprising:

bonding an extended polyethylene terephthalate resin sheet onto a surface of the crystallized resin sheet, by glue, to enclose the aperture or concave portion.

10. The method of claim 2, further comprising:

bonding an extended polyethylene terephthalate resin sheet onto a surface of the crystallized resin sheet, by glue, to enclose the aperture or concave portion.

11. The method of claim 3, further comprising:

bonding an extended polyethylene terephthalate resin sheet onto a surface of the crystallized resin sheet, by glue, to enclose the aperture or concave portion.

12. The method of claim 4, further comprising:

bonding an extended polyethylene terephthalate resin sheet onto a surface of the crystallized resin sheet, by glue, to enclose the aperture or concave portion.

13. The method of claim 5, further comprising:

bonding an extended polyethylene terephthalate resin sheet onto a surface of the crystallized resin sheet, by glue, to enclose the aperture or concave portion.

14. The method of claim 6, further comprising:

bonding an extended polyethylene terephthalate resin sheet onto a surface of the crystallized resin sheet, by glue, to enclose the aperture or concave portion.

15. The method of claim 7, further comprising:

bonding an extended polyethylene terephthalate resin sheet onto a surface of the crystallized resin sheet, by glue, to enclose the aperture or concave portion.

16. The method of claim 8, further comprising:

bonding an extended polyethylene terephthalate resin sheet onto a surface of the crystallized resin sheet, by glue, to enclose the aperture or concave portion.

17. A method of producing an identification card, comprising:

applying magnetic recording media tape on a surface of a substantially unoriented non-crystallized polyethylene terephthalate resin sheet; and heating the non-crystallized resin sheet to crystallize the resin sheet, and applying pressure to the tape, thus forming a substantially unoriented crystallized polyethylene terephthalate resin sheet having the tape embedded therein.

18. The method of claim 17, wherein the crystallized resin sheet has a crystallization degree of 15–45%, and has spherulite crystals.

19. The method of claim 17, wherein the crystallized resin sheet has a heat resistance of 220° C. and a tensile strength of at least 100 kg/mm$^2$ at 100° C.

20. The method of claim 18, wherein the crystallized resin sheet has a heat resistance of 220° C. and a tensile strength of at least 100 kg/mm$^2$ at 100° C.

21. The method of claim 17, wherein the heating is conducted at 160° C. for one minute.

22. The method of claim 18, wherein the heating is conducted at 160° C. for one minute.

23. The method of claim 19, wherein the heating is conducted at 160° C. for one minute.

24. The method of claim 20, wherein the heating is conducted at 160° C. for one minute.

* * * * *